United States Patent
Lapshina et al.

(10) Patent No.: US 10,789,943 B1
(45) Date of Patent: Sep. 29, 2020

(54) PROXY FOR SELECTIVE USE OF HUMAN AND ARTIFICIAL INTELLIGENCE IN A NATURAL LANGUAGE UNDERSTANDING SYSTEM

(71) Applicant: Interactions LLC, Franklin, MA (US)

(72) Inventors: Larissa Lapshina, Shirley, MA (US); Mahnoosh Mehrabani Sharifbad, North Bethesda, MD (US); David Thomson, North Salt Lake, UT (US); Yoryos Yeracaris, Boston, MA (US)

(73) Assignee: Interactions LLC, Franklin, MA (US)

( * ) Notice: Subject to any disclaimer, the term of this patent is extended or adjusted under 35 U.S.C. 154(b) by 151 days.

(21) Appl. No.: 16/120,182

(22) Filed: Aug. 31, 2018

(51) Int. Cl.
| G10L 15/00 | (2013.01) |
| G10L 15/18 | (2013.01) |
| G10L 15/30 | (2013.01) |
| G10L 15/22 | (2006.01) |

(52) U.S. Cl.
CPC .......... *G10L 15/1815* (2013.01); *G10L 15/22* (2013.01); *G10L 15/30* (2013.01)

(58) Field of Classification Search
USPC .................................. 704/231–257, 270–275
See application file for complete search history.

(56) References Cited

U.S. PATENT DOCUMENTS

| 5,033,088 | A | 7/1991 | Shipman |
| 5,987,116 | A | 11/1999 | Petrunka et al. |
| 6,411,686 | B1 | 6/2002 | Porter et al. |
| 6,499,013 | B1 | 12/2002 | Weber |
| 7,606,718 | B2 | 10/2009 | Cloran |
| 8,484,031 | B1 | 7/2013 | Yeracaris et al. |
| 8,560,321 | B1 | 10/2013 | Yeracaris et al. |
| 9,922,650 | B1 * | 3/2018 | Secker-Walker ..... G10L 15/083 |
| 10,325,599 | B1 * | 6/2019 | Naidu ................. H04M 3/5307 |
| 2017/0192423 | A1 * | 7/2017 | Rust ..................... G05D 1/0077 |
| 2017/0212886 | A1 * | 7/2017 | Sarikaya ................ G10L 15/22 |
| 2019/0088256 | A1 * | 3/2019 | Lin ..................... G06F 16/3334 |

* cited by examiner

*Primary Examiner* — Jesse S Pullias
(74) *Attorney, Agent, or Firm* — Fenwick & West LLP

(57) ABSTRACT

An interactive response system combines human intelligence (HI) subsystems with artificial intelligence (AI) subsystems to facilitate overall capability of multi-channel user interfaces. The system permits imperfect AI subsystems to nonetheless lessen the burden on HI subsystems. A combined AI and HI proxy is used to implement an interactive omnichannel system, and the proxy dynamically determines how many AI and HI subsystems are to perform recognition for any particular utterance, based on factors such as confidence thresholds of the AI recognition and availability of HI resources. Furthermore the system uses information from prior recognitions to automatically build, test, predict confidence, and maintain AI models and HI models for system recognition improvements.

20 Claims, 7 Drawing Sheets

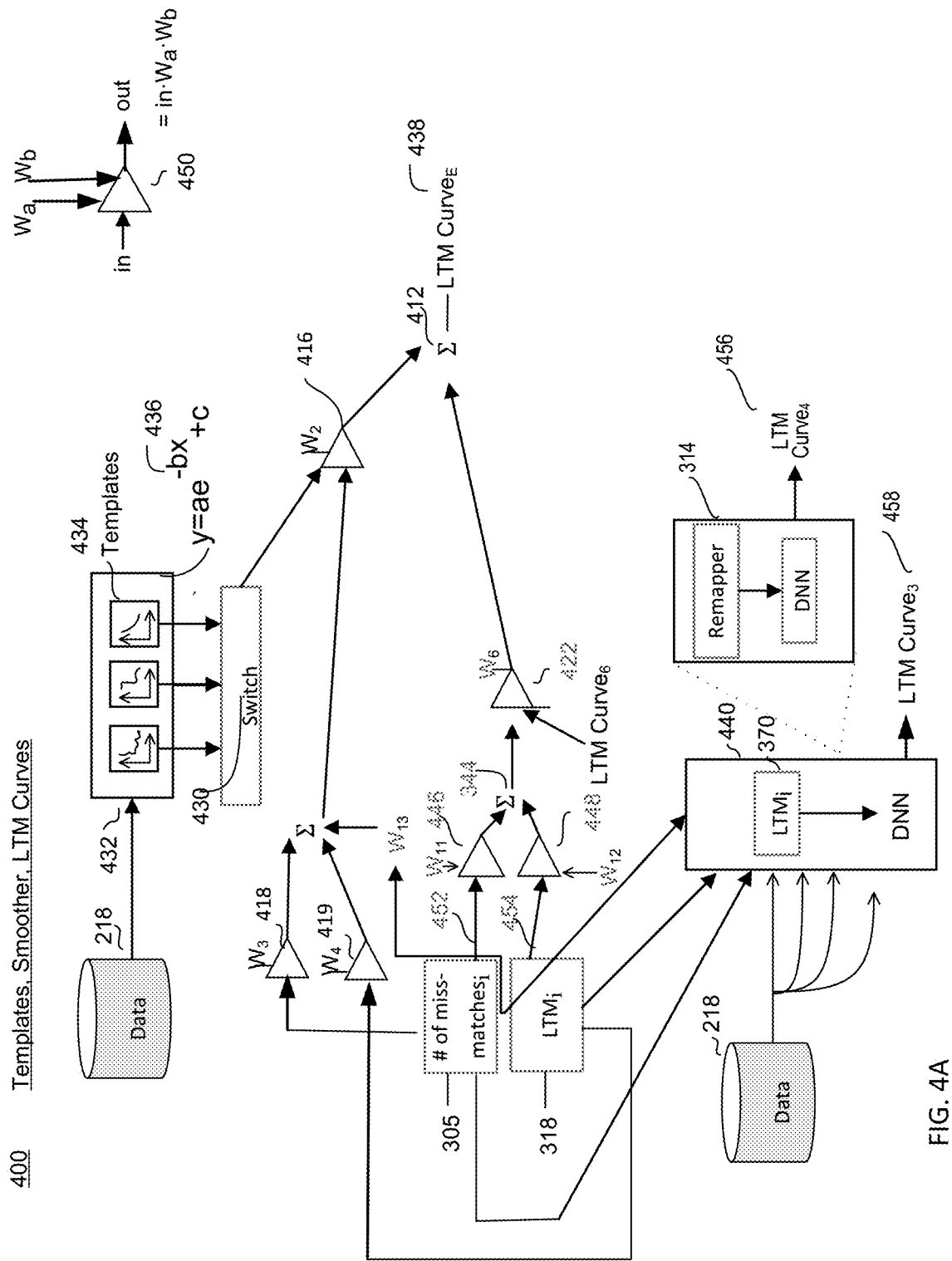

PROXY FOR SELECTIVE USE OF HUMAN AND ARTIFICIAL INTELLIGENCE IN A NATURAL LANGUAGE UNDERSTANDING SYSTEM

FIELD OF ART

This disclosure relates to the field of conversational response communication systems (interactive voice response (IVR), chat, SMS (Text), social media), and, more particularly to an interactive response communications system that selectively and/or concurrently routes utterances to Artificial Intelligence (AI) processor(s), Human Intelligent recognition (HI) resource(s), or both AI and HI, as well as to facilities for building and testing AI models.

BACKGROUND

Many companies interact with their users (herein referred to for simplicity in the singular as "a user"), via electronic means (most commonly via telephone, e-mail, and online text chat, web, social media, etc.). Such electronic systems save companies a large amount of money by limiting the number of needed customer service or support agents. These electronic systems, however, generally provide a less than satisfactory user experience. The user experience may be acceptable for simple transactions, but are frequently inconsistent or downright frustrating if the user is not adept at talking to or interacting with a computer. Automated systems can have various drawbacks, such as unintuitive constrained vocabularies or system flows, misrecognitions of speech, the need for extended learning periods to improve recognition. Human agents may be employed to listen to recognize utterances, but this too has downsides, such as latency, expense, and the inability to scale up for heavier traffic loads.

SUMMARY

An interactive response system mixes human intelligence (HI) subsystems with artificial intelligence (AI) subsystems to facilitate natural language understanding and improve overall accuracy and capability of user conversations. The system permits imperfect automated speech recognition (ASR) or natural language processing (NLP) confidence subsystems to use HI when necessary, and to nonetheless relieve the burden on HI subsystems under load. A proxy is used to implement a conversational system, and the proxy decides, based on a set of algorithms, to route an utterance solely to one or more AI instances, to route it to one or more HI instances in addition to at least one or more AI instance, to route it solely to one or more HI subsystem, to reroute an utterance originally sent to an AI over to one or more HI, to use HIs to help tune and train one or more AI systems, and/or to use multiple AI instances to increase reliability of results. (The term "utterance" is used herein for simplicity to denote user input that is interpreted. In some embodiments, utterances are audio; in some embodiments, utterances are textual.) Thus the proxy can send a single utterance to any number of AI and/or HI instances, which in turn creates data that is be used to further tune and train, and test AI for automation and/or AI for human assistance. The proxy enables the streaming of the utterance to multiple recognition sources to enable a testing method, herein referred to as LTM.

In one aspect, the proxy includes a recognition decision engine and a results decision engine. In a related aspect, these two engines facilitate recognition performance. The proxy facilitates natural language understanding using models for accurately filling information slots in various business forms. The proxy is additionally used for automated training, tuning, and testing of AI and HI models.

In a further aspect, the proxy selects AI and/or HI resources based on one or more of application criteria, recognition confidence prediction, historical results, recognition of a particular user's utterance, sentiment analysis, and psychographic factors. The proxy can further send information to the dialog manager to adjust the dialog model to tailor the dialog to the user.

In yet another aspect, the proxy is configurable based on various parameters, such as the extent to which to make use of AI, or the extent to which to make communication "human-like".

In yet another aspect, the proxy adjusts automatically to system resource capacity of HI to maximize use of AI (ASR/NLP and/or dual-tone multifrequency (DTMF) for voice conversations).

In yet another aspect, the proxy uses the results of the evaluation component (confidence score) that analyzes AI results to select one or more of: optimal lengths for length-based test, optimal quality metrics levels for user responses to different prompts, and optimal classifiers for different prompts.

In still another aspect, selection of AI or HI resources by the proxy is transparent to a software application calling upon the proxy for recognition services. In still another aspect, the system uses methods to predict successful automation recognition in as close to real time as possible when using HI in order to provide a more human-like experience. The proxy can also be used to sample AI and HI utterances to store data which is used to build AI models.

In still another aspect, the system automatically verifies AI and HI models which are newly built or edited (whether automatically, semi-automatically, or manually). The models are tested and predicted to operate better than previous models, or to be sufficiently accurate to be used by the system to process user utterances.

Those skilled in the art will recognize that a particular configuration addressed in this disclosure can be implemented in a variety of other ways. Unless otherwise defined, all technical and scientific terms used herein have the same meaning as commonly understood by one of ordinary skill in the art to which this disclosure belongs.

The features described above may be used alone or in combination without departing from the scope of this disclosure. Further features and various advantages will apparent from the following detailed description, taken in conjunction with the accompanying drawings, in which like reference characters refer to like parts throughout.

BRIEF DESCRIPTION OF THE DRAWINGS

FIG. 4A illustrates one embodiment of the LTM system selecting from various templates to best match the curve used to create an LTM curve.

DETAILED DESCRIPTION

Glossary

Figure 1:
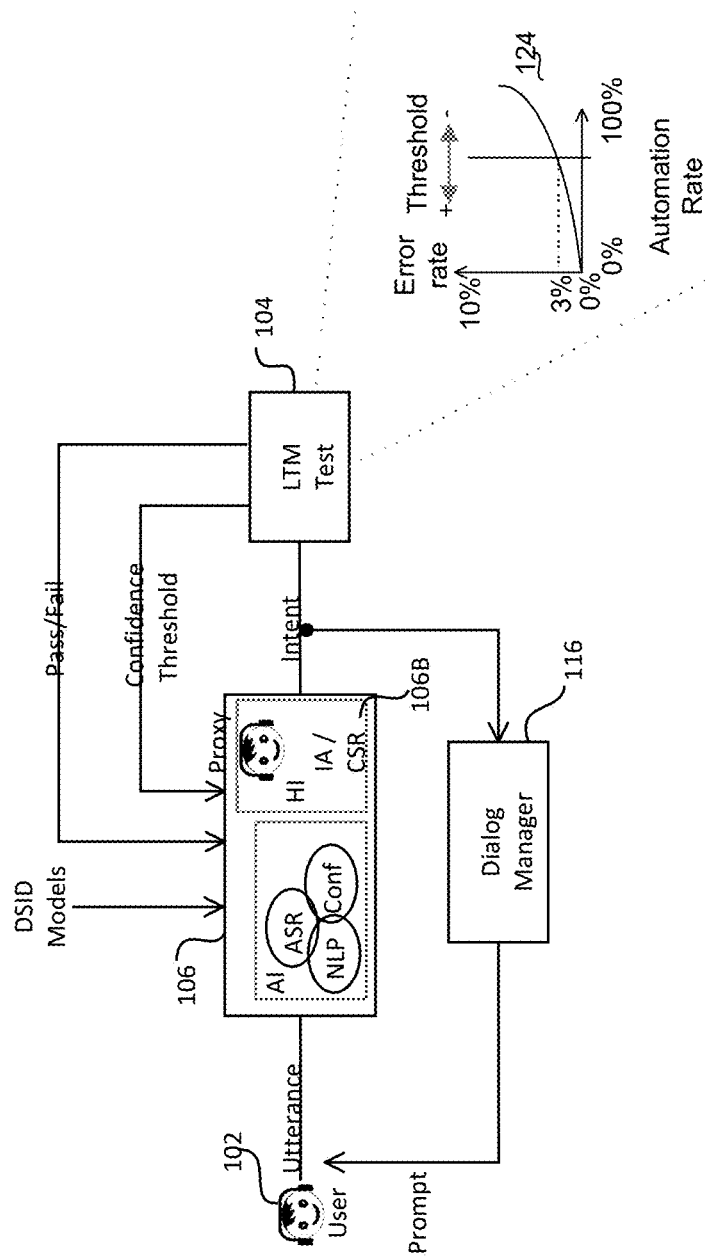
FIG. 1 is a block diagram of one embodiment of an architecture of the conversational system.

AI: Artificial intelligence, which consists of ASR, NLP, ML, and Confidence Scoring (note image recognition and drawing recognition are not discussed in this disclosure, but are and can be conversational "utterances").

ASR: Automatic speech recognition. For simplicity in this disclosure, ASR recognitions using grammars (such as number) or language models (such as classifiers) are referred to as "intents."

CSR: Customer Service Representative (agent). Like an IA, a CSR is a human listener, but unlike the IA, they can communicate directly to the user. CSRs are used when complexity increases such that more information is required to fulfill the user requests. Like the IA, CSRs have a specialized graphical user interface (GUI), which uses different models to assist the human agent to make better decisions. Unlike the IA, the CSR can freely add information into the system and freely communicate to the user.

Confidence Score: A value produced by AI that represents how close an utterance is to an expected result. E.g., the higher the value, the more accurate the expected results.

Confidence Threshold (Threshold): A value used by an application (or by the proxy to determine routing of an utterance either to HI or AI) to determine the next step in a conversation.

CQA: Certified Quality Assurance, where the "true" intents of utterances of various types are periodically sent to HI during non-peak times, in sufficient quantity to grade the quality of a specific HI agent.

Dialog Manager: Software that executes a conversation (an application) with the user.

DSID: A dialog state identifier. Dialog state is the particular point of the conversation that the user is in, such as "Enter flight destination" or "Accept or decline conditions". An identifier is a construct that identifies that particular state. We refer to the collection of systems and software and data and recordings and so on that refer to that dialog state as the dialog state models.

HI: Human Intelligence, which includes a GUI interface to either a Customer Service Representative (agent) or to an Intent Analyst (agent), to assist with a conversation with the user. Whether or not to use HI can be automatically determined by the Proxy.

LTM: A testing methodology involving a set of sample of data representing utterances collected and compared between recognition approaches (AI and HI), where if AI results match HI results, the utterance interpretation is considered correct or "truth". Sample sizes range from several hundred samples for a particular DSID to thousands for more complex model tests.

IA: Intent Analyst, a human recognizing utterances (a form of HI). A specialized GUI is used for the IA, which may transcribe what the IA is hearing, or use key words, read text, and or select an intent from a predefined list. The IA reads or listens to what a user says and may indicate what the user's intent was or what the user wanted. Intents are distilled by IAs from an utterance, which in turn tells the application what was "recognized". For example, if the utterance is: "I dropped my phone and the screen's cracked," then the IA could conclude that the intent is "Phone Technical Support/Screen Crack", which the application could interpret as indicating a user desire to speak with technical support, or with sales, depending on application criteria.

ML: Machine learning, where a computer learns through data and other techniques about patterns to increase the machine's capability of performing an automated task.

NLP: Natural language processing, the goal of which is to determine the Intent of an utterance that is understandable for by an application. This is often called "classification".

Proxy: A recognition system that makes decisions on how to "recognize" a particular DSID, such as through automation (ASR, NLP), and/or through sending an utterance to HI when the confidence in AI is sufficiently low. The Proxy contains APIs to four AI recognition components: a speech recognizer; an intent classifier based on NLP technology; a confidence estimator; and a Human Intelligence interface. The Proxy can decide which resources are to be used, including simultaneously routing to one or many AI recognizers, and/or routing to one or many HI recognizers.

The following set of diagrams describes a model testing method (also known as the LTM). This application is for reducing the effort of a combined Human Intelligence and Automated Intelligence conversational system through automating and predicting. The diagrams describe a system where a combination of humans and automated recognizers and other automated systems carry on a conversation with a user. The system performs three functions: (1) generating an accurate curve that predicts accuracy versus error rate and error rate versus automation rate; 2) selecting the confidence threshold that maximizes automation rates, using humans when appropriate, and minimizing error rates; and (3) reducing the need for human judgment.

System Overview

FIG. 1 is an overview of the entire system, according to one embodiment. There is a user (caller, chatter, texter, web user, . . . ) 102 that connects into the system via a phone, an app on a smart phone, a video call, a text chat (from typing), a browsed website, or a social media channel. The user connects, and a dialog manager 116 initiates the opening part of the dialog, which is presented to the user. A response from the user to the presented dialog is sent to the proxy 106 for "recognition". In some embodiments, an identification component of an enterprise system authenticates and identifies the user, and supplies the conversational system with information about the user relevant to the enterprise. For the purpose of this disclosure, this part of the process is not described, though data 240 collected from the Enterprise is stored to enhance context data associated with model building. The proxy manages recognitions services. The proxy can select models for a specific DSID (dialog state, or models that are tailored to specific Industry Verticals, or models that are general model, or even models tailored to user characteristics); models used by Automated Speech Recognition, which produces one to many (n-best) "transcripts" of utterances; models for Natural Language Processing; models for confidence scoring; selection of a threshold; and access to intent analysts (IAs)/customer service representatives (CSRs) for Human Intelligence Assist. These systems together transform the utterance into machine readable form, including transcribing the utterance for data collection, processing the utterance into parsed text (NLP), and (optionally) inferring the intent of the utterance as output. The utterance from the user can also be transmitted to an LTM Test 104. The LTM Test 104 inputs the utterance from user 102 with intents supplied the Proxy (by Artificial Intelligence (ASR, NLP, Confidence Score) and/or the intents from Human Intelligence (IA/CSR), 106, and attempts to determine how accurate that intent is based on a given set of testing samples. The LTM test collector waits for a sufficient number of samples to be collected before producing results. LTM Test 104 has two objectives: first, to generate a Confidence Threshold, and second, to generate a Pass/Fail signal that indicates whether AI 102 is sufficiently accurate to be deployed and handle live users for customers. LTM Test 104 automatically generates curve 124 that relates automation rate with accuracy, and further computes a threshold for the desired accuracy and automation rate. If the accuracy and automation rates are acceptable, then the LTM test 104 generates a pass signal. Otherwise, it generates a fail signal. In the case of a pass signal, the LTM test 104 computes the optimal threshold based on the target accuracy for the dialog state ID (DSID).

Figure 2:
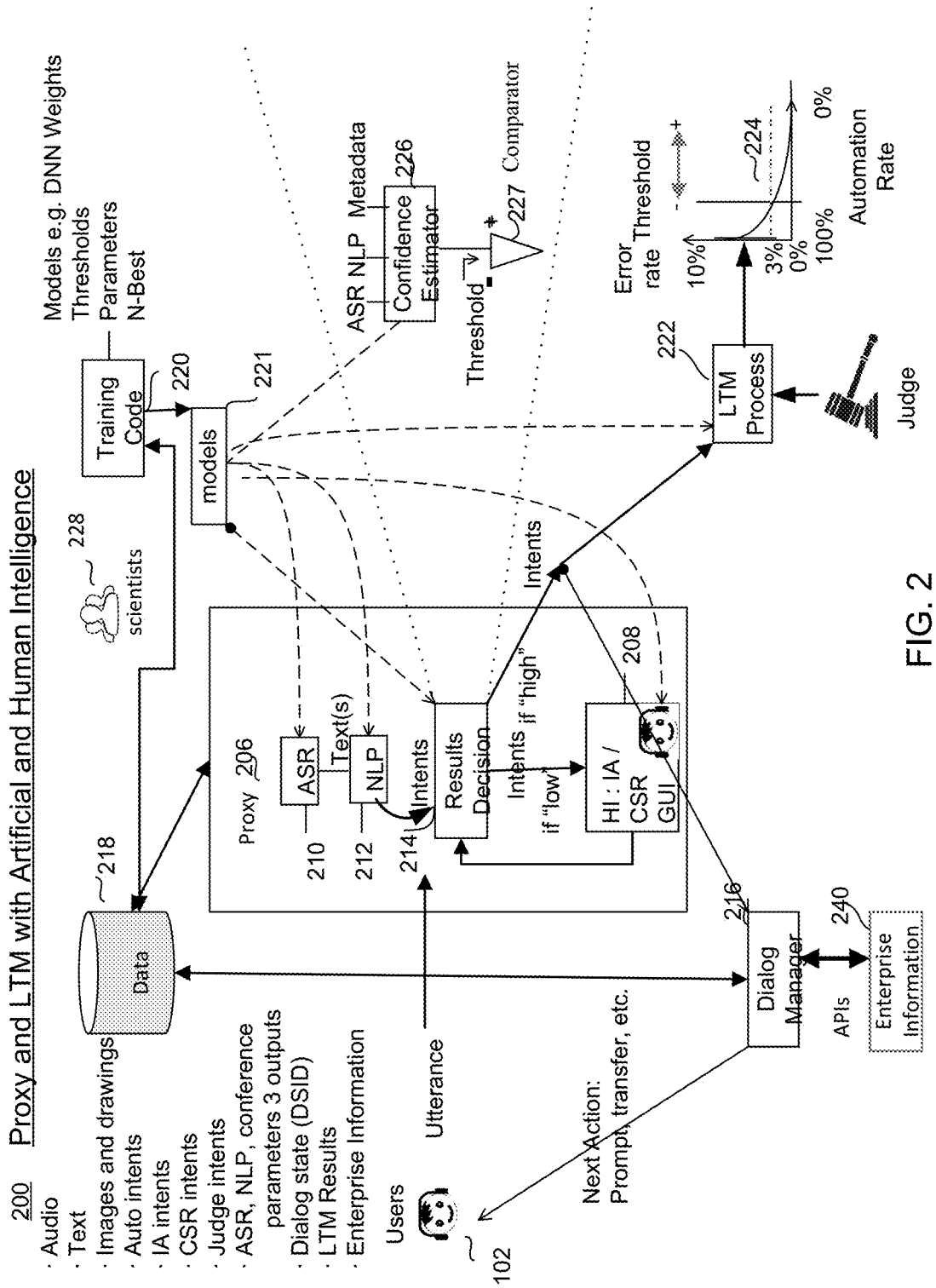
FIG. 2 illustrates how the proxy combines various recognition, testing, judgment, estimation and scoring mechanisms combining HI and AI, where AI uses models and continuous tuning, testing, and training machine learning methods to automatically build models for AI (ASR, NLP, and HI GUIs).

Referring to FIG. 2, users 202 are people who are trying to use the system, e.g., to communicate with Customer Support for a company. They may dial a number, or click an application in their smart phone that establishes a voice or voice-plus-video connection to the system in FIG. 2, or they may initiate chat on a web page. The first component with which they interact is the Dialog Manager 216, which initiates the conversation. The Dialog Manager 216 starts up a dialog based on one or more of a number of things, such as the number that the user dialed, the dialing number, or other factors, such as chat, SMS, or data on a website, as just some examples. The Dialog Manager 216 then initiates a conversation, often using information associated with the user connection, such as login to a Website, or an originating phone number. Once the user 102 is connected, the system plays a prompt to the user suggesting that they respond. The user's response, then, goes through an audio and/or video and/or text channel to the Proxy 206. The Proxy 206 makes the decision to send the utterance for recognition to one or more AI resources (ASR 210/NLP 212) and/or one or more HI resources 208 (human users such as intent analysts or customer service representatives). This decision is based on different factors in different embodiments. For example, if the speech recognizer 210 doesn't know how to interpret utterances in the current dialog state (i.e., there is no good model for the state), then it may not be prepared for an utterance that the user is likely to provide, so the Proxy 206, in that case, may send the utterance to HI resources 208. If there is a set of models that is useable by the particular dialog state, then the utterance is sent to ASR 210/NLP 212.

The Dialog Manager 216 runs on a machine with predefined steps that are often based directly on output from recognitions and on what the intent is (i.e., what the user wanted). The Dialog Manager makes a decision of what dialog state to transition to next, what feedback (if any) to provide to the user to indicate what is happening, and what prompts to give to the user (if any) to solicit more information. The Dialog Manager 216 may also take actions other than handling user conversations. For example, the Dialog Manager 216 may authenticate the user; the Dialog Manager may obtain account information or enterprise information 240 through Enterprise APIs (e.g., a user bank balance); or, the Dialog Manager may set up an account for the user; or, the Dialog Manager may reset a piece of equipment that the user is trying to get working. The Dialog Manager 216 has interfaces not just to the user but also to other back-end systems that include things like Enterprise Information, such as user records. Note that the Proxy 206 and Dialog Manager 216 are functions that occur normally at runtime (when the user 202 is conversing with the system).

The LTM process 222, which generates the LTM curves 124, can be run offline. The LTM process 222 can be run periodically to check model quality and automation. It can be run when the system load has low demand for HI, where historical utterances can be sent to HI for recognition and data collection. The LTM process 222 may use human judges, in which people review utterances and intent hypotheses from AI and HI 206 and assess accuracy. In some embodiments, the LTM 222 process uses no human input for assessing accuracy. In some embodiments, the system automatically produces models that can be processed by the LTM process 222. As illustrated in FIG. 2, an LTM curve 224 has a Threshold that determines automation rate and its associated accuracy. Based on the desired level of accuracy and the desired level of automation, the LTM process 222 may pass or may fail a model. The AI and HI processes use as input a set of models 221: ASR models, NLP models, confidence models, and HI GUI models. The performance of HI depends partially on the software inside the HI GUI, which can run independently of the HI GUI models. When the LTM process 222 is run, it evaluates not just the AI but also the quality of the HI GUI models. If these models pass, then the models can be used by the system for live traffic. If the models do not pass, then the models can be rebuilt using additional data, or the LTM process can determine that automatic model generation is not sufficiently capable and HI 208, should instead be used. In some circumstances, tailored models built with hybrid data from AI and HI, by specialized operators (scientists 228), may be employed when building the initial (or on-going) models for automation.

ASR module 210 transcribes the utterance into one or more text strings based on a set of models (including acoustic models and language models). In some embodiments, multiple transcribed strings are ordered in an n-best list, ranked by "Confidence Score". Other embodiments employ other formats for the output of the speech recognizer. For example, a lattice can be used to represent the output of the speech recognizer or features for each "word". The n-best interpretations of the utterance and/or text strings are input to a natural language processor 212 where they are converted to one or more of a set of possible intents. The natural language processor determines, based on the text and other features, what was the intent of the user. This intent, along with other parameters, is sent to a confidence estimator 226. The confidence estimator 226 determines the probability that the intent is correct. If the probability is high (e.g., above a given threshold), then the intent out of the natural language processor will be used. If the confidence is low, then the utterance may be sent to the HI 208. The HI 208 may or may not have access to the AI and the intent classifier (where the HI GUI is designed in a manner to enable intent determination without HI GUI assist). The HI 208 then processes the utterance. In one embodiment, in the case of audio, playback of the utterance is sped up to reduce the elapsed time the user has to wait for a response due to interpretation by the users of the HI 208.

The HI (e.g., using GUI assist) determines the user intent, and indicates that intent by clicking on a screen and/or typing, or typing and selecting an intent. The HI has access to a console or computer or some form of display and/or headphones and/or microphone that the HI can use to indicate the intent.

The software that the HI 208 uses is referred to as the GUI. The GUI plays or streams audio to the HI (or streams text, e.g., in the case of user chat or email), and brings up a display that allows the HI to type, click, select or otherwise enter information related to the intent or transcription in the case of data collection.

Figure 2A:
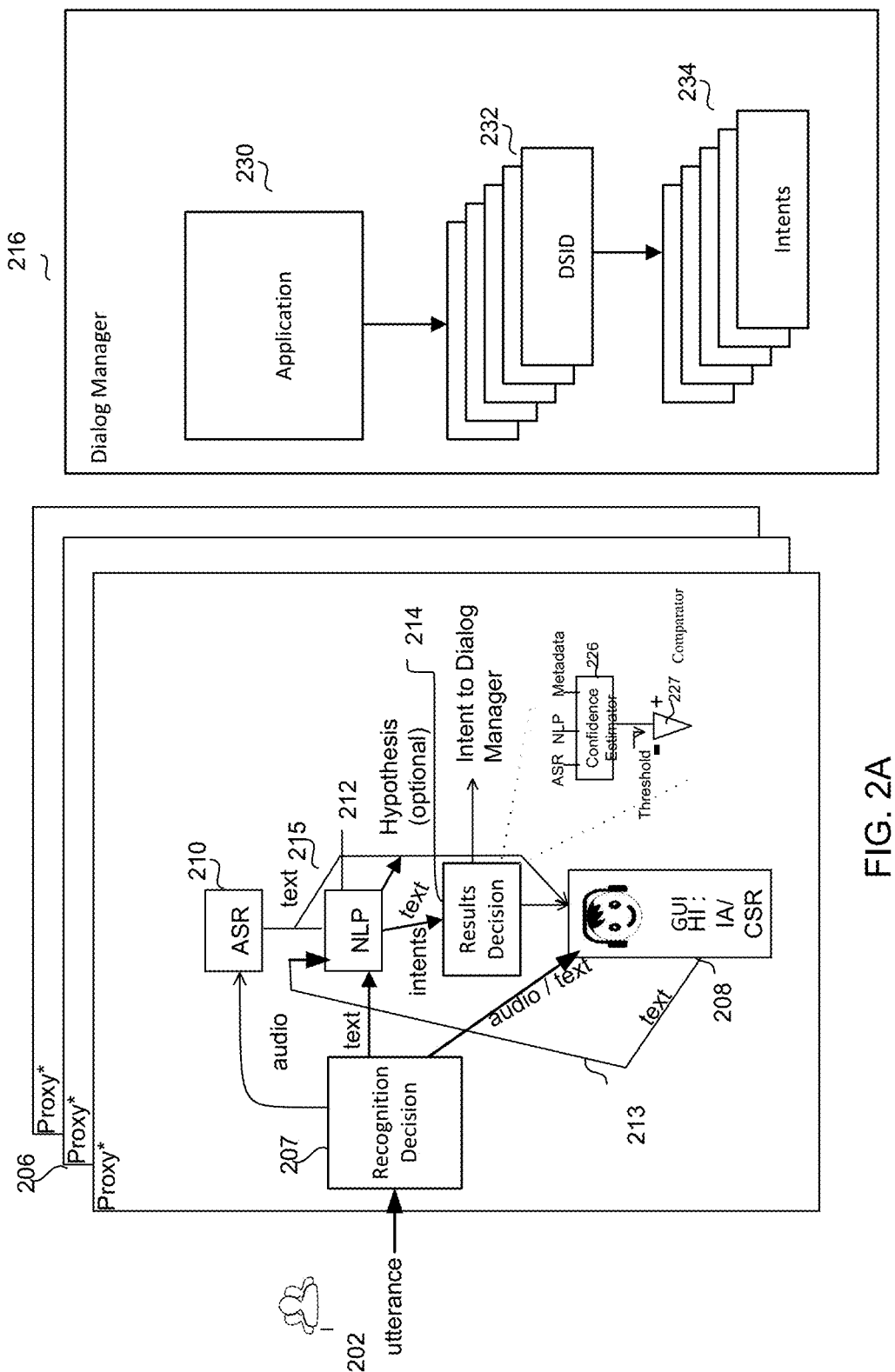
FIG. 2A illustrates how the proxy uses various recognition services, combining HI and AI, where AI and HI use models for recognition services and a Dialog Manager running an application, where the application has a number of DSID's with a defined set of valid Intents.

Returning again to Results Decision 214, there are two major components in the decision: confidence estimator 226, and a result comparator 227 (illustrated in FIG. 2A). The confidence estimator 226 uses any one or more of a number of different estimation methods, including maximum entropy methods, linear classification methods, neural maps, or some other classifier that outputs an estimation of input. In this case, the confidence estimator 226 takes input from the speech recognizer ASR and/or the natural language processor NLP and/or other metadata. Relevant metadata in some embodiments include, but are not limited to, psychographic information, socio-economic information, previous utterances and conversations, and Enterprise data. The metadata may also include the time of day and date of the conversation; the "channel" or mode of the conversation (phone call, chat, short message service (SMS), etc.); the amount of time that has passed since the previous conversation; parameters, information, confidence, hypotheses, and any other information that is generated from previous utterances or from one or more previous conversations. For example, the confidence from the previous conversation may give a hint as to the confidence of this current utterance. The input to the confidence estimator might be confidence from a previous dialog state in the current conversation. All this data is stored in Data 218. The dialog state identifier (DSID) may be a yes/no question such as "Are you paying for this with a debit card or a credit card?", or an open ended type of question such as "How can I help you?"

The confidence estimator 226 also takes all information from the speech recognizer 210 and natural language processor 212, such as audio features, not just the text and intent. For example, the speech recognizer 212 may output a Confidence Score itself, or it may output a parameter that describes how much CPU time was used in coming up with a result. The natural language processor 212 may have other information internally or externally that will give the confidence estimator 226 clues. The Confidence Estimator 226 can also pull information from log files that are output by the speech recognizer 210 and natural language processor 212. Once the Confidence Estimator 226 has come up with a result, which we call Confidence Score, then this Confidence Score is compared to a Threshold using Comparator 227. If the score is greater than or equal to the Threshold, then the confidence is considered high. If it is below the Threshold, then the confidence is considered low. The confidence (high or low) is used by the Results Decision 214.

If there is a low confidence, the utterance can then be processed by HI 208 to determine the intent(s) of the utterance. If there is a high confidence, then the intent(s) from the NLP process is used. For illustrative purposes, FIG. 2A, illustrates the utterance going to any number of recognition resources of the Proxy 206, AI and HI 208.

The Recognition Decision 207 may direct the utterance, including audio in the case of voice, and other information needed by the HI GUI, directly to one or more HI resources 208. A result(s) (e.g., N-best text) is then returned 213 to NLP. Once the intent has been determined by one or more NLP processes 212, the Results Decision (the Intent or n-best Intents) 214 is sent to a dialog manager 216. The dialog manager 216 determines, based on the intent(s), what should be done next. For purposes of this disclosure, Intents are items that are known to the application (a series of Dialog Manager steps).

The NLP module 215 processes input by disassembling and parsing expected features in the input and determines the appropriate entity extraction (such as named items like products) and processes input, through a model mapping the (n-best) word results into (n-best) intents, which are predetermined output language and semantic schemes used by an application. The Application 230 inputs the outputs of recognition, such as intents 234 (i.e. what an application can understand). The intents 234 may be specific to a DSID 232, or general to a particular industry vertical, or application to all industry verticals, such as in the case of yes/no questions. Thus modeling strategy is complex and variable. For the new generations of applications, Proxies 206 may be organized within a semantic domain, for example a Reservations Proxy vs. a Locations Proxy, where the utterances are recognized by each Proxy domain manger, and the Results Decision acts more as voting evaluation or best fit evaluator of results from these multiple Proxies. For example, for a Hospitality application, after the Dialog Manager 216 prompts "How can I help you?", if the user utterance is "What hotels are available in Boston?", the utterance is processed by the Proxy 206 through multiple Proxy instances, one for "How can I help you", one for "New Reservations", one for "Locations of Hotels", and the results are then scored and the Results Decision with the highest confidence is from the Location Proxy. This result is in turn sent to the Dialog Manager 216.

The results (intent) returned by the Proxy 206 influences the next step in the conversation, according to the Dialog Manager 216, which will depend how the dialog state transitions have been defined for that application. Note that conversations may be generated from "knowledge graphs", and may be comprised of domain specific sets of dialog steps, such as address collection module, or reservation collection module, as some non-limiting examples. The modules are built to be domain specific, with their related AI models.

For example, if the user said the word "operator", the Dialog Manager 216 may determine that the user wants to talk to a human, so the next action may be to transfer the conversation to HI CSR 208. If the user said a phone number, then the dialog manager may make a decision based on Rules. If the user utterance is "phone number", then we may go to the next dialog state x, whatever that next dialog state is determined by dialog design (knowledge graphs, rules, hard code, etc.). In this case, the next action is executed, and the process begins again until the dialog reaches an end or the conversation concludes.

Model Training

The disclosure up to this point has focused on the runtime execution of a user conversation using recognition service from the Proxy 206, AI and HI 208, i.e. what goes on during the live conversation or during the time when the user is connected to the system. There are other systems and other processes that occur offline, either after the conversation or before the conversation, that may process multiple conversations and/or utterances at the same time. One such process is the training process. Data 218 for the training code 220, is used to train the ASR 210, the NLP intent classifier 212, and Confidence Estimator 226, models 221. The ASR 210 for example, may use an acoustic model and a language model. The acoustic model describes the sounds of a user's voice, and the language model describes the content of what people are likely to say. NLP 212 uses an intent model. The intent model indicates, given an utterance, an intent implied by that utterance. The Confidence Estimator 226 uses a confidence model. The confidence model determines, based on a set of information 226, the actual confidence level reflecting the accuracy of the recognition services.

In some embodiments, these models may be generated offline, before runtime. In some embodiments, models can be generated, or at least adapted, at runtime. There are two major parts to model building (often described as "machine learning"): the "raw" Data 218, the training algorithms, and Training Code 220. The input data for model building are utterances (audio, text, video): raw utterances (recordings from users who have conversed in the past), or utterances that may have been obtained from other sources. Data may be obtained from previous conversations, previous services, or from other sources, such as purchased data, data recorded in another system, or data from enterprise information, as some non-limiting examples.

Building models for a particular dialog state, data is collected for that dialog state and related dialog states. As one example, the Dialog Manager 216 may start the conversation, prompting, "How may I help you?". The user 102 responds, "I need your fax number". The system records the conversation, as audio, text, video, etc.: (1) whatever the system prompts from 216, audio, text words or as spoken text and (2) what the user responds, "I need a fax machine", (3) words and features from ASR, and or (4) text and features and Intent(s) (classification) from NLP, any data associated with the conversation. All of that information, including log information, may constitute Data 218. Data 218 includes utterances from users: audio, text (which can be speech from the speech recognizer, sometimes referred to as the hypothesis), text from chat, a web-based GUI, an application, or video, as just some non-limiting examples. For audio, Data 218 can include text from offline transcriptionists (e.g., the intent analysts 208). Intents may be automatically inferred using NLP models, or may be manually determined by HI 208 using the HI GUI to specify intents for utterances either in real-time or offline. Data 218 can also send stored utterances to the Proxy 106, simulating the real-time process, to HI GUI 208, or through other means, to label the utterances with intents.

The intents determined by a Judge process are another example of data that may be included in Data 218. The Judge process may produce a manual result specified by HI 208 using a specialized GUI, or may automatically produce a result by comparing multiple results from the same utterance, through multiple models, multiple recognizers (AI and HI), and n-best lists, as some non-limiting examples. For more complex Models, where models may require very low error rates, the automatic judgment may require at least a majority or all Intents to agree or may require processing by one or more HI Judges. Another example of data included in Data 218 is all the parameters and results from ASR 210, NLP 212, Confidence Estimator 226, Comparator 227, Results Decision 214, and LTM process 222, with all inputs and outputs and configurations. Other information that could be part of Data 218 is the dialog state identifier (DSID), and data which is stored, as previously mentioned, is data about the user, purchased data or from a company, Metadata from an Enterprise, and previous conversations.

The scientists or automatic processes use the Training Code 220 to generate models 221 from data. Training Code 220 can build models for the ASR 210 and NLP 212, Confidence Estimator 226, and the GUIs for HI 208 and the LTM process 222. These models can take a number of forms. One form, for example, can be weights in a neural network. Those weights could comprise part of a model. Another part of the model may be a Threshold or set of Thresholds, or other parameters that describe how the components in Proxy 206 should operate. The models may be specific to a DSID, in other words, a particular DSID or group of DSIDs may use the same set of models, or they may have different models. Models maybe specific to a vertical industry, for example Hospitality, or Transportation. A DSID, for example, may have its own language model, its own Intent model, and its own Confidence model. Sometimes, certain models are shared and other models are not shared. For example, a large group of DSIDs may use the same acoustic model, but they may use different language models used by ASR and NLP, and confidence models used by the Confidence Estimator 226.

Figure 3:
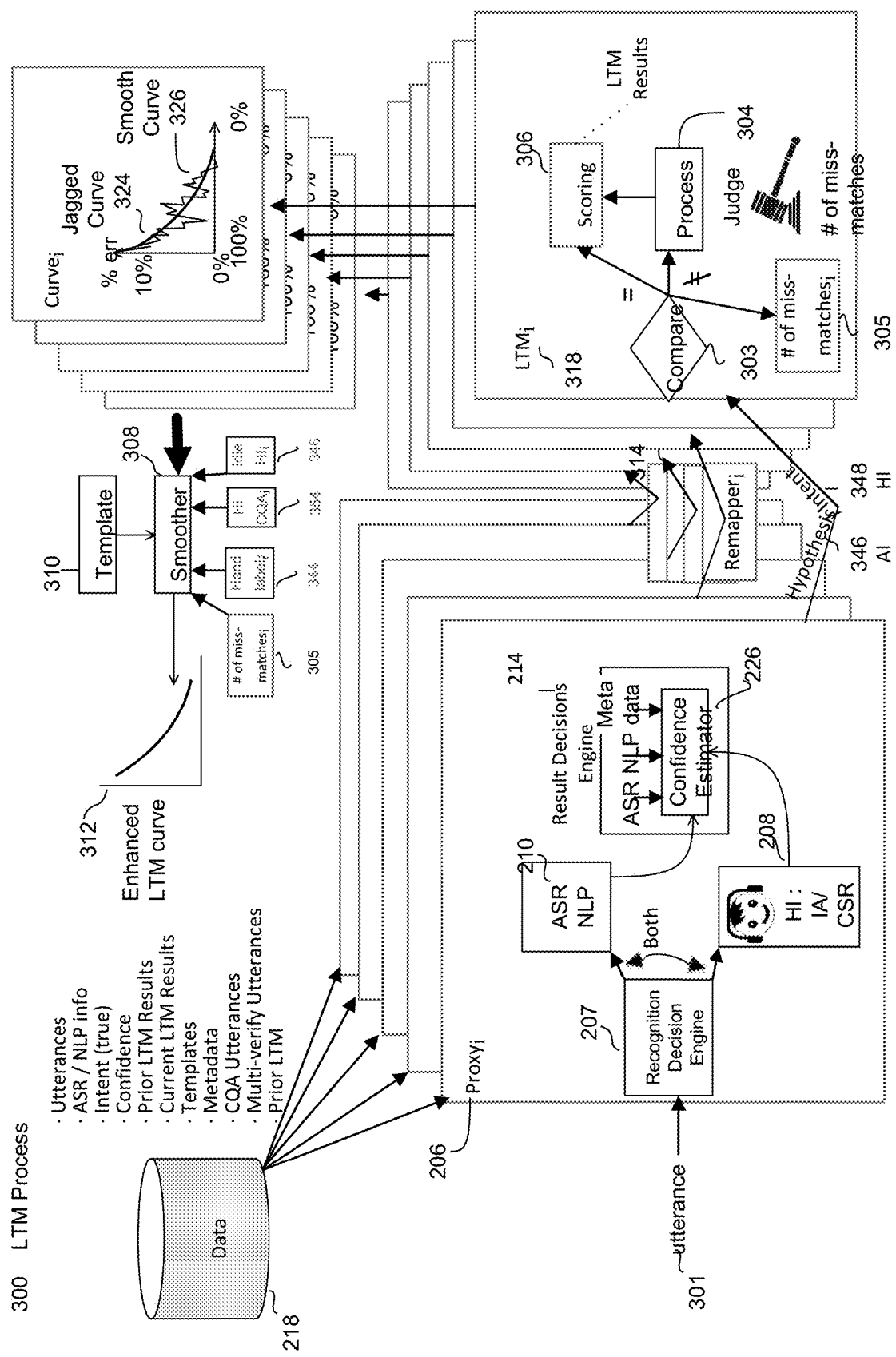
FIG. 3 illustrates the LTM estimation process to be used with automatically building, testing, and predicting confidence scores for models used in AI and HI (GUIs).

Another offline process is the LTM process 222. This is a process that can automatically run periodically for determining: model quality control, model deployment verification, and the values of certain parameters. The LTM process 222 may be a quality assurance test. Its workings are described in detail in FIG. 3. In brief, a human judge and/or an automatic judge 304 may process a set of conversations and examine the intents that came out of those conversations, and determine which intents are correct. The output of the LTM process 222 produces a curve 224, organizing data by Confidence Score interval. Those utterances with high confidence scores tend to have fewer errors, and as the Confidence Score decreases, the error rate increases. The curve 224 can be configured visually in several different ways. In the example of FIG. 3, the curve 224 is shown with the x-axis representing automation rate of AI, and the y-axis representing the error rate. The Confidence Score is not shown as part of this curve 224. If the overall error rate for AI is 10% and the HI error rate is 3%, a Threshold is set to target an overall error rate of 3%. Utterances with Confidence Scores equal to or above the Threshold are processed by AI. For example, 75% of the calls are processed by AI, and 25% are processed by HI 208. The Proxy Results Decision examines the Threshold from AI and those utterances for which the Confidence Score is below the Threshold are sent to HI 208. Working together, AI and HI 208 in this example have a combined error rate of 3%, substantially lower than the 10% error rate of AI standing alone.

The Threshold is a value on some scale, such as the integer 22 on a scale of 1-100, that represents a minimum degree of confidence in the interpretation of an utterance produced by an AI, confidence values below the threshold result in HI being employed for the utterance. The Automation Rate corresponds to a number between 0% and 100%, reflecting the number of utterances that are being automated through AI, successful recognition results (intents) to the Dialog Manager, instead of from HI. For every threshold value there's a corresponding automation rate with an associated error rate. In the diagram for curve 124, at the threshold there is a 3% error rate. In the example of FIG. 1, with the curve sloping upward and to the right, as automation gets closer to 100%, but the error rate increases above the threshold, thus HI 208 is better to process these utterances. If we increase the Threshold, the error rate and Automation Rate are reduced.

FIG. 2A depicts the Proxy and recognition services 206 with more detail on the relationships between the Dialog Manager 216, dialog state (DSID) 232, and intents 234. Often there are thousands of utterances as part of an LTM process 222 for a specific model. The HI Judge will have to potentially evaluate thousands of utterances. Models improve with better accuracy, as number of utterances increases and the utterances are evaluated by the Judge process. The HI Judge's time is expensive, not only in monetary cost, but also in elapsed time to perform this task across potentially thousands of models for DSIDs. Thus, it is preferable to reduce, or ideally to eliminate, the number of utterances that need to be evaluated by the HI Judge. However, as the numbers of utterances evaluated by the HI Judge are reduced, the measurement of the error rate, the setting of a Threshold, and the "rejection rate" within a particular range of accuracy, using prior methods, become more difficult. In the normal utterance path in the Proxy 206, utterances go to one or more ASRs (models); the ASRs provide text to one or more NLPs (models) that output an intent for the utterances; then Confidence Scores 226 are calculated for the resulting recognition, and if below the Threshold, the transcription from or intent selection from HI are used. One path through the Proxy is when the utterance goes directly to one or more HI 208, where instead of classifying an intent through the GUI, the HI transcribes the utterance or an approximation of the utterance. Then the transcribed utterance 213, goes through one or more NLP Models 212. The NLP models 212 process the typed text as if it had come from the ASRs. Using the Proxy 206, there are many paths that an utterance may take depending on criteria, model accuracy, system load, LTM verification, use of multiple models, multiple versions of ASR and/or NLP, and/or the maturity of the application. In the example where HI 208 doesn't need to be trained to know and select Intents, NLP models 212 are used for a real-time transcribed utterance, which significantly reduces training time for the HI 208. There are multiple variations on this diagram, as well. The HI 208 may type the utterance in the GUI using autocorrect from the GUI determined by ASR, and/or NLP models 212, or typing key words or selecting from a list, or the HI GUI may enable Intent selection, or have text (n-best lists) provided by the ASR going to the HI GUI. The HI 208 can examine the n-best results from AI and either: accept it; edit it; accept portions of it; or retype and/or select intents independently. The possible Intents are defined by the application. Whether the system provides the ASR text hypothesis to the HI 208, or the parsed and tagged utterance from NLP, depends on a number of factors, including how much the HI 208 is trusted not to just blindly accept the AI output, and how accurate the AI is likely to be. In some cases, the HI 208, using the GUI, may label the intent of the utterance. The Intent, through the various Proxy paths which get evaluated and compared and scored, goes to the Dialog Manager 216 in some embodiments; in other embodiments, the intent is used in an offline situation where the HI 208 receives utterances from stored data, thereby simulating real-time processing. The purpose of combining intents with utterances is to provide data for Data 218 using which to generate models 220. All of the intents come out of the NLP and/or the HI GUI. A certain number of human-labeled intents is needed in order to build models, and not to bias the models. To obtain the human-labeled intents, distributed sample output is used from HI, where a sample of utterances are sent to HI for Intent labels. Data for the LTM process 222 includes a sample of all utterances for a specific model, where the utterance goes to HI 208 and the GUI assists in labeling intents or transcribing the utterance and the NLP processes intents. The LTM sample could be obtained in real time, or in an offline process, the goal being to collect utterance and intent information (as well as metadata). Utterances could be batched for HIs 360 in off-peak hours, or a separate pool of HIs could label the intents using the specialized GUI.

The Data from the LTM process 222 then can be used for training by the training code 220. The HI GUI for this scenario is configured so that HI 208 can input text or intents to optimize what is required for the training process. The Proxy 206 can be configured to send utterances either to one or more AI instances or to one or more HI instances, where the LTM process 222 has different sets of models to compare results either real-time or offline.

FIGS. 3, 3A, 4, and 4A provide details on the LTM process 222. As in FIG. 3, utterances of the users 202 are sent to the Proxy 206, which simultaneously sends the utterances to one or more AIs instances and/or one or more HIs 208 for processing. The HI results 348, and the AI results, 346 both provide their determined intents to Compare, 303, where results are compared. If the results agree, i.e. if both the AI results and the HI results produce the same intent, the system assumes that these intents are correct. In some embodiments, therefore, the Judge 304 then only listens to utterances for which the results of the Compare 303 are not equal. Especially if results are compared from multiple instances of both AI and HI, this comparison process significantly increases the accuracy if all the intents are equal; in this case, the intent result(s) are sent directly to the Scoring 306 as "True".

For those utterances where the AI results and HI results are not equal, an HI Judge with a specialized GUI 304 processes the utterance, reviewing all the resulting intents, and selecting or entering a correct result. The Judge may determine that the AI results are correct or the HI results are correct, or both, or neither. The Judge may additionally specify the "True" intent—that is, the trusted intent treated as ground truth. These results from the HI Judge are sent to the Scoring process 306. "True" intents can also be derived from a set of utterances, where more than one source (AI and HI) agree on the same utterance. Furthermore, for more complex models, 100% agreement of more than two sources may be required for "True" intents.

These "True" intents are considered "ground truth" for evaluating the accuracy of the hypothesized intents from Proxy 206. This hypothesized intent goes to the Scoring Block 306. Scoring Block 306 can make a decision in one scenario where it simply looks at the intent as determined by AI and the ground truth intent and, if they match, makes the assumption that the AI was correct. If they don't match, then the Scoring Block 306 makes the assumption that the AI was incorrect, after which the number of correct utterances and the number of incorrect utterances are scored. Scoring Block 306 also receives a signal from Proxy 206, which is the confidence. This confidence comes out of the Confidence Estimator 226. By having access to the true intent, the hypothesized intent from Proxy 206, and the confidence, the Scoring Block 306 is able to chart what the accuracy is at different levels of confidence relative to the automation rate 324.

One of the drawbacks of the HI Judge process is that even given a substantial sample size (e.g., 1,000), the HI Judge still requires human input, though it is an automated HI process, to potentially adjudicate hundreds of result mismatches depending on utterance and model complexity. For example, yes/no questions tend to have a relatively small number of variants for the utterances and intents, whereas the more complex question "How may I help you" could have a large number of variances in utterances.

The LTM curve 324 can be quite jagged, and the estimate is uneven and the sample size insufficient. The desired results are a smooth curve 326, with as few HI Judge samples as possible, ideally with no samples, but with a least a very small number of them. The curve 324 is provided as input to a smoother 308, and the smoother computes an estimate of this curve accuracy. The result is illustrated in enhanced LTM curve 312. The smoother 308 creates this enhanced LTM curve by using input from a number of different sources. For example, in the embodiment of FIG. 3, the smoother 308 receives inputs from a set of templates 310 (representing different types of known curves), hand labeled utterances 344, a value representing the number of mismatched utterances 305, a set of HI CQA utterances 354, a set of utterances labeled by idle HIs 346, and the LTM process, output 308.

The Template 310, is a set of estimates of a targeted shape of the curve. For example, the template 310 may describe the shape of the curve using a set of numerical parameters. For example, if the curve has a downward slope and it looks like an exponentially decaying curve then it may be defined with a pair of parameters: the speed of the decay and the starting position. The template is where the shape of the enhanced LTM curve is modeled with one or more parameters from LTM results. More complicated curve shapes can be predicted with more parameters, some of which are shown in item 340 of FIG. 3A. For example: "digits" may have one shape of the curve; "yes/no" DSIDs may have a different shape; and "how may I help you" ("HMHY") may have a different shape. Combining a number of DSIDs with similar shapes into a cluster (illustrated as Cluster 1, and Cluster 2, for example) is another mechanism to create a particular template for that set of DSIDs. Templates may be curves derived from larger sample sizes with known ground truth. Templates may be revised and improved over time and represent well-known LTM results. The advantage of using a matching template is that the calculation of LTM results can be performed on a sparse data sample, not requiring the large number of samples needed to define the entire curve. The "matching" parameters can be computed by selecting parameters that result in a modeled template that matches data obtained in a given LTM test. The modeled template may optionally be represented by the curve plus a residual, which is the difference between the modeled template and the actual curve. Since this form may be represented by a smaller number of parameters, instead of having to estimate every sample on the curve, estimating just the parameters and a residual allows a better LTM curve to be derived from a small set of samples.

For example, if the a shape of the LTM curve was an exponential decay, a best fit calculation using as few as two parameters (i.e., the starting position and the speed of the decay mapped-model may use a best fit algorithm to match the curve based on parameters to the actual shape of the curve that we find from the experiment) would give us a smooth curve that is more accurate and easier to use than the original LTM curve with a sparse sample size. The templates are a set of models for different curve shapes that can be used for LTM curve estimation, and these templates may be selected based on the DSID or sub-domain of the DSID (which corresponds to the shape of the curve in an LTM process). For instance, if an LTM process is run across 500 samples, the smoothing function may be achieved by understanding the shape of the LTM data and matching a template that best fits the shape of the LTM data, which can eliminate or minimize the need for an HI Judge, and/or run in standard LTM mode, i.e. comparing x number of LTM samples using the HI Judge.

Another approach to estimating the enhanced LTM curve 312 is to use the number of possible intents as a feature to estimate what the intent accuracy is or what the overall accuracy of the LTM curve is, and this helps in estimation of the LTM curve shape. The number of possible intents for a user utterance represents how many things a user can say or how many different types of things can a user ask for in a particulate state or situation. Thus, for a particular situation in which a user is expected to answer a yes/no question there might be are two possible intents: "yes" and "no." For a state in which a user is expected to answer a more open-ended question there might be ten possible intents, such as, "I want customer service," "billing," "accounting," or "I want to disconnect my service." A count of the number of intents provides a hint as to the degree of accuracy because the more intents there are, then the harder it is to determine the correct intent. Another approach is to use the information entropy of the intents (i.e., the statistical definition of entropy as the degree of uncertainty), which takes into account the likelihood of each intent. For example, there may be ten possible intents, but if 95% of the time users have the first of those intents, then the entropy is fairly low—that is, the uncertainty is low, even though there are a relatively large number of possible intents. Thus, entropy, or the number of possible intents, or both, can be used to estimate the accuracy in the system of the LTM process. In one embodiment, the entropy of each word may be determined, then the average entropy may be determined for the utterance by averaging the word entropy across all words in the utterance. The average entropy is an example of an entropy-based feature that may be used to estimate intent accuracy.

Yet another feature for estimating accuracy may be the length of the utterance. Recognition of longer utterances may tend to be less reliable. Thus, a long utterance can be weighted differently or even eliminated from the LTM process. This feature can be combined with other features (e.g., the number of possible intents, or the degree of entropy) as input to the smoother 308 and used to estimate accuracy.

Additionally, templates and the smoother can be used to understand (as in the LTM process) results which produce curves from AI and HI during normal operations. Using a template-matching algorithm, and comparing one or more of these production curves, model success (automation and error rates) can be predicted.

FIG. 3 depicts several inputs, $Proxy_i$ 206, through $LTM_i$ 318 resulting in LTM $Curve_i$ 324. Whether LTM test was run with the HI Judge, an AI Judge, or whether it was run with just the automated system AI, that LTM $Curve_i$ 324 is potentially one input to the smoother. The notation "i" represents one or many instances (versions of data sets containing utterances, models, proxy, application intent, remapper, LTM), as an example of one of the "rows" in FIG. 3A, item 370.

Another input to this smoother is represented in $LTM_i$ as LTM lite. An $LTM_i$ lite is where there is no HI Judge, but rather LTM results depend upon the judgment of one or more AI results for the same utterance, and/or one or more HI results for the utterance 208, to determine ground truth. In other words, results of the AI output 346, and the HI output 348, are compared for the same utterance 301. If the results match, then the AI is assumed to have been correct. If the results don't match, then the AI is assumed to have been incorrect. Since there is no judge arbitrating whether the HI was correct or not, and also since the HI is operating in real time and so may be less accurate, the LTM lite score may not be as precise or as regular as curve 224. However, the LTM lite score is nonetheless a useful input, and the population of sample sizes can be very large because no HI judge need be involved.

Yet another embodiment is an LTM lite process that does not use an HI Judge, but rather uses intent determination from an HI IA/CSR, ignoring the results from HI that score less on HI CQA results 350, or weight results depending on CQA accuracy. Because the cost of HI Judge verification renders it infeasible to produce a large number of HI Judge verification samples, there is still some uncertainty even in the case of some HI Judge verification, so the process could benefit from other estimators being factored in. The standard LTM test is a feature used by the smoother 308 in some embodiments.

In FIG. 3, $Proxy_i$, $LTM_i$, and $LTM\ Curve_i$ are all input to the smoother 308, producing a curve which is the output of various configurations and models for each instance of $LTM_i$ over time for a specific DSID, representing explicit outputs of the speech recognizer, the NLP and tech classifier and the Confidence Score, but also internal parameters, metadata, the AIs and HIs may generate—internal parameters may be different types of Confidence Scores, goodness of matching scores, information pulled out of the log files, and so on. All this information coming from the Proxy 206 is input into the Enhanced LTM curve process represented in FIG. 3.

Figure 3A:
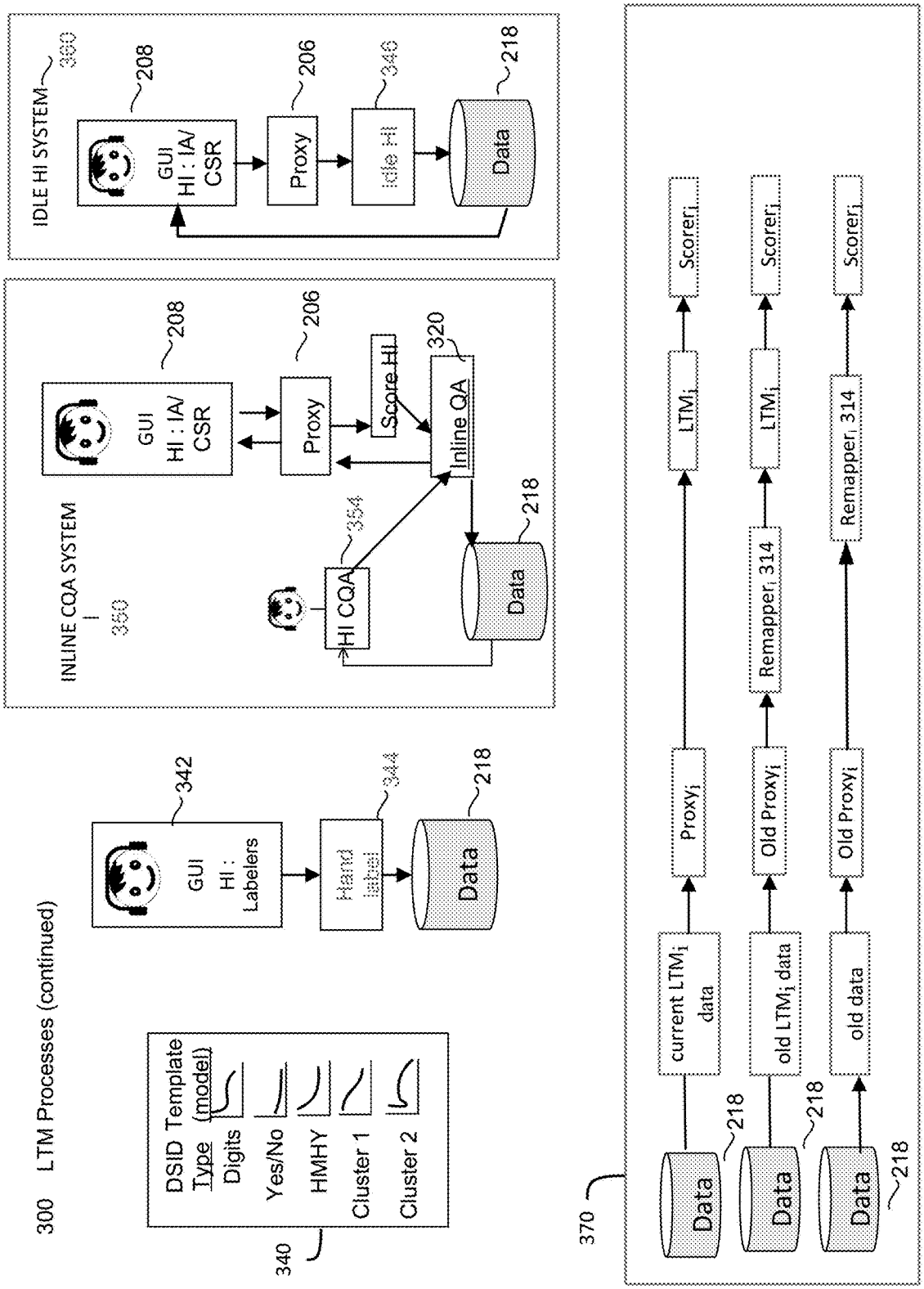
FIG. 3A continues the illustration of the LTM estimation process to be used with automatically building, testing, and predicting confidence scores for models used in AI and HI GUIs.

FIG. 3A illustrates, via the inline CQA system 350, a process to monitor and confirm the accuracy and performance of the HI IAs/CSRs. The inline CQA system 350 plays test utterances, where the answer or "ground truth" is known and the results can be used to verify the HI and/or AI recognitions. For a selected set of data 218, the intents associated with the data 218 are certified by quality assurance agents HI CQA 354 and deposited into a subset of the data 218. The HI CQA process is similar to the HI Judge process, where results are verified or modified to be "ground truth". The HI CQA process selects a set of utterances from the data based on some schedule, for example, selecting utterances at random, or selecting utterances for which a DSID is being tested, where one or more HI CQA processes an utterance and selects or enters what is referred to as a "certified intent". The certified intents are performed by highly-skilled HI CQA agents 354, where each utterance may be "double checked" before the intents are considered to be correct. It is assumed that the HI CQA data is more reliable than the typical HI data. The HI CQA utterances are provided on some random schedule to AI and/or HI for quality verification of AI and HI recognition. Neither the AI nor HI know that they are processing a certified utterance, but rather process the utterance as if it were part of the normal user conversation. Since the true intents are known by the system, based on what HI CQA determined, quality scores for the AI and HI components can be derived to quantify the accuracy of the results. In some embodiments the quality scores are organized by DSID type, and if the quality of the recognition results are below a given accuracy for HI and/or AI, actions are taken. Actions for HI could include additional training, and actions for AI could include moving that set of utterances to be checked by both AI and HI, or rebuilding models, as non-limiting examples. These certified utterances can also be input into the smoother 308, as shown in FIG. 3A 370. Additionally, utterances recognized by HI with higher quality scores can be more strongly weighted by training code 220.

Input into the smoother 308, can include HI-only data, AI-only data, a comparison of HI and AI data, data processed from both one or more AI and by one or more HI, etc, In each of these cases, the reason for using "True" intents and hypothesized intents as input to the smoother 308 is that the smoother is trying to get an estimate for how accurate the AI results are by processing actually corrected results in the system, processing massive amounts of utterances, with massive number of models, by using different data sources, and different verification techniques, to match template curves, to predict the results of AI. Different data from differing processing sources, along with metadata and context data, can determine how utterances are classified and the accuracy of the classification; possible types of such data are represented in FIG. 3A, item 370 (Data→$Proxy_i$,→$LTM_i$, →$LTM\ Curve_i$), for example, can be purely HI data, purely AI data, HI and AI data, old data from previous LTM tests, current LTM test data, multi-model AI data, multi-model HI data, data labeled by CQAs, data labeled by idle HIs 360, LTM data, as some non-limiting examples. Each source of data, grouped by DSID or sub-domain, is used by the smoother 308 to estimate accuracy, combined with a template match, when needed to extend a sample size of data. Yet another approach using the current LTM, FIG. 3 illustrates processing data and running it against an old model or a model that was built based on data that existed at a previous time, for example, an old LTM data set, then the smoother, 308, compares the current LTM data against an old model, which may require intent remapping 314. The current LTM data can be calibrated to either multiply by the height of the LTM curve by some number or add or subtract by some number from the curve.

All of these different views on what are the true intents by matching template curves, and/or use of expert HI (HI Judge, 304, HI CQA, 354, HI Labelers, 342, multi-checked utterances, Idle HI 360, multi-model matched intents, high accuracy HI (HI CQA scores)), on "truth", are used by the smoother to compare results from the proxy 206, to quantify actual accuracy of the proxy at different confidence levels for different models.

All of these different result sources can be combined to create the enhanced LTM curve 312, which is an estimate of the "Truth.". The combination is accomplished in different ways in different embodiments, such as by a majority voting, a weighted sum, or a discriminant analysis (e.g., Fisher's linear discriminant analysis). The algorithm for combining these can be multiple—because there are many possible algorithms, over time, the best algorithms can be used.

In one embodiment, a curve is created for each of the different results produced by the differing methods, and the curves are averaged together. The curves may be weighted together based on reliability of the inputs, each curve being assigned a different weight in this average, and the weights could be determined, for example, using Fisher's linear discriminant analysis (LDA).

Other useful inputs are the results from previous LTM processes shown in FIG. 3A. However, intents may change as applications are modified, as user utterances change due to market conditions, or as more modern application building techniques are used; results from previous input sources represented in FIG. 3, Data 218→$Proxy_i$→206→$LTM_i$ 318→$LTM\ Curve_i$, could be used for the same or similar DSID as the current DSID being processed by the LTM process. For example, if this DSID is a "yes/no" DSID, results from other LTMs, such as another "yes/no" DSID, can be used or results for a cluster of DSIDs. The issue with using previous DSIDs or other DSIDs is that the intents may not exactly match: for example, there may be 5 intents for the current DSID, whereas there were only 4 intents for the older version, if the application split one of the prior intents into two other intents. Thus, the use of historical LTM processes entails the use of a mapping between prior and current sets of intents. In the case of a previous LTM process, or an LTM process from another DSID, where utterances and/or intents are similar, a Remapper$_i$, matching algorithm is used to determine how the intents of the previous LTM process match the intents of the current LTM.

FIG. 3A, item 370, represents an example of set of utterance inputs, Data 218→Proxy$_i$, →LTM$_i$, →LTM Curve$_i$→Scorer$_i$ is generated by a combination of old LTM data with Remapper$_i$ 314 (described below) and current LTM data.

Whenever an LTM test is run all the data is captured and stored in data 218.

One goal of using old LTM process results is to generate a known LTM curve. The old data uses an historical instance of the Proxy$_i$ 206. This is the Proxy$_i$ 206 that was built for a previous LTM process or previous application version. The reason an older Proxy$_i$ 206 is used is to provide a different perspective on how the shape of the LTM curve may historically look. The historical utterances, for the old Proxy$_i$, go through the same process. At the same time the intent as determined by the old Proxy$_i$. goes into the scorer and is compared to the result out of the current proxy. Note that the output of old Proxy$_i$ is both a Confidence Score and an intent score 306. Scoring 306 takes as input a confidence, the NLP intent, the hypothesized intent from the current Proxy$_i$, and the true intent from the old Proxy$_i$ LTM data, and constructs an LTM curve$_i$ 326 much like the current LTM curve, except that it tries to predict the shape of that curve.

Instead of using current LTM data and an old Proxy$_i$, old LTM data can be used with a current proxy. The intent from old LTM Process should be provided as input to the scoring 306, but intents may have changed from an old LTM process to the current LTM process. For example, between the old LTM$_i$ process and the current LTM process, a new product may have been introduced or something else may have happened to create a difference in intents. For example, if the iPhone X is introduced after the old LTM$_i$ process, then people might start saying "iPhone 10" or "iPhone X", but neither of those phrases may appear in the data 218 for the old LTM$_i$, so intents will need to be remapped. The intent Remapper$_i$ 314 allows conversion of intents from a LTM$_i$ process to corresponding intents for the current LTM process. In one embodiment, an intent map table is created, where each old intent is mapped to a corresponding new intent. More complex forms of remapping can also be employed. These remapped intents go into the scorer 306 and are used to compute an LTM curve$_i$, which is provided as input to the smoother 308.

Another situation that may occur using Data→Proxy$_i$, →LTM$_i$, →LTM Curve$_i$, the Remapper$_i$ 314 may rebuild the intent classifier (NLP) based on particular intent changes. To do so, the phrases describing the intent changes that would map to that particular intent are identified. The intent map is then used to modify the old training data 218, so that the training data contains the new intents, the training data being utterances processed by the proxy 206. The training code 220 uses that data and intent classifier for LTM curve$_i$. The remapper is used to update intents, mapping old to new, or new to old, to be able to make data consistent to produce a new LTM curve$_i$ to the smoother 308.

Yet another input represented by FIG. 3A are hand labels 344. In such a case, a set of data (utterances) are processed and hand-labeled by humans, which could include detailed pronunciation characteristics for ASR models and/or intent identification. The hand labeled data can be yet another instance of Data input into Data→Proxy$_i$,→LTM$_i$,→LTM Curve$_i$, which is processed by smoother 308. The inputs to smoother 308 are then used to generate an enhanced LTM curve 312. The smoother is described in more detail in FIG. 4.

The Enhanced LTM curve 312, and smoother 308, relates to sophisticated smoothing of Curve$_i$ 324, using models with multiple inputs to best match "truth". Another option for smoothing a curve is to add together some number of adjacent samples, or to average them together with some weight. For example, the median could be taken of five adjacent samples, and the middle sample replaced with that median.

Figure 4:
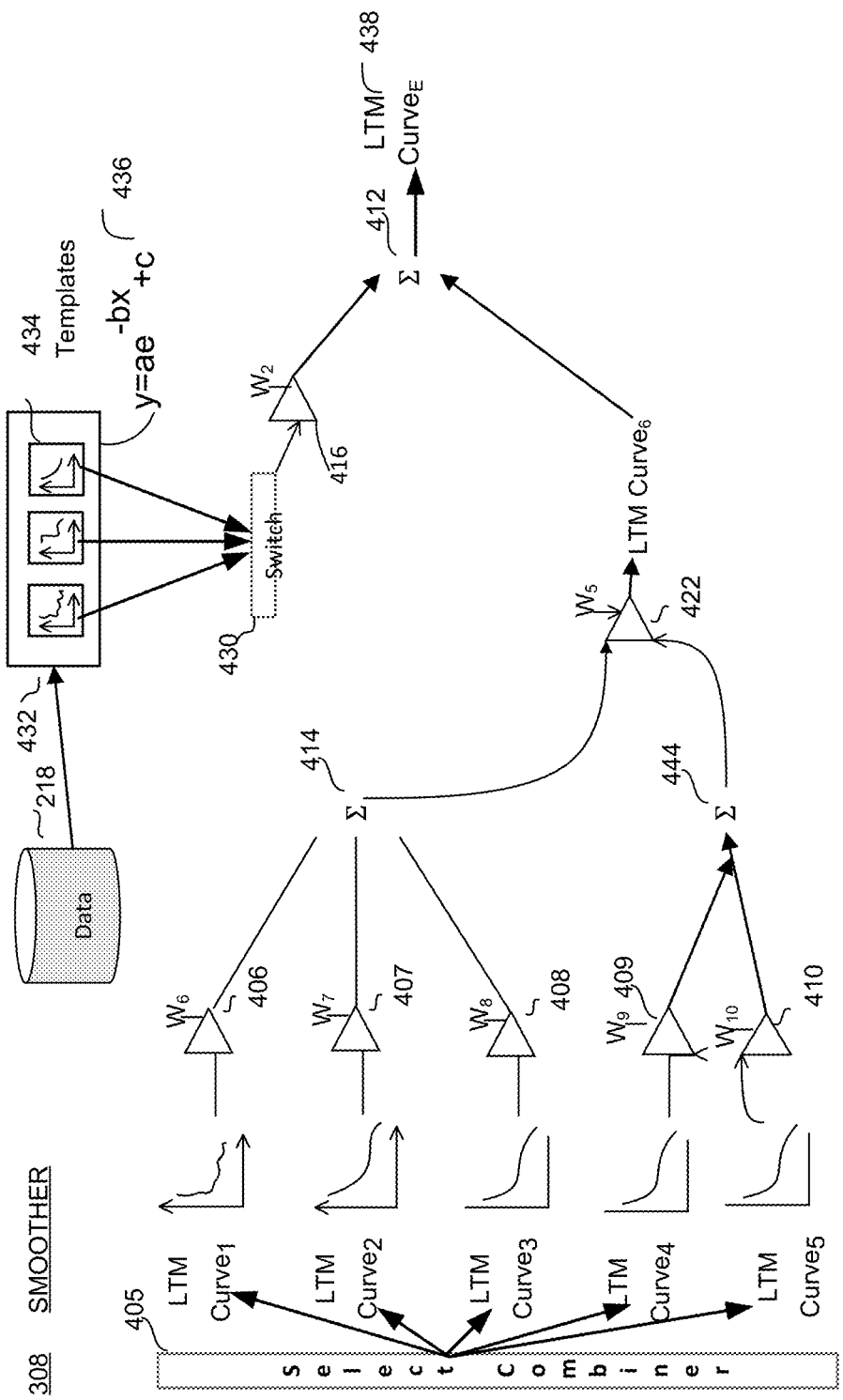
FIG. 4 illustrates the smoother process for data collected by HI and AI to predict a confidence score for the built models.

In FIG. 4, the notation $W_i$ represents a multiplier. The multiplier is used as an amplifier, with an input and an output. The notation of $\Sigma$ represents summation. In an example with two input LTM curves, the output=input$_1 \times W_1$ (LTM Curve$_1$)+input$_2 \times W_2$ (LTM Curve$_2$). If there is only one input, then the output=input$\times W_1$ (LTM Curve$_1$).

FIG. 4 illustrates several embodiments of smoother 308 and scoring 306, which generate an enhanced LTM curve 438 from a set of other LTM curves. In one embodiment, each of the LTM curves is made up of an input data set corresponding to a particular sub-domain of data that is disjoint with respect to the other sub-domains, such as different models of smartphones (e.g., "IPHONE 4", "IPHONE 7", "IPHONE 8", "IPHONE X", "GALAXY S7"), and represents the relationship of intent recognition automation rates and intent recognition accuracies for conversations about the corresponding sub-domain (e.g., conversations about the iPhone X). (Note that LTM curves need not be continuous, smooth curves, but may be "jagged" sets of unconnected <intent recognition automation rate, intent recognition accuracy> pairs.) The input data sets are combined, resulting in a continuous composite curve defined by curve parameters. The correctness of the continuous composite curve can be quantified by comparing the continuous composite curve to different related template, e.g., for a domain that encompasses the disjoint sub-domains (such as a template curve for "smartphone" in general, which encompasses the various specific models of smartphone). If the degree of correctness of the continuous composite curve is at least a given minimum level, then the continuous composite curve is determined to correctly model the aggregate of the sub-domains as a whole. A confidence threshold for achieving at least a given intent recognition accuracy can then be identified on the continuous composite curve (e.g., for a particular continuous composite curve, it might be determined that at least 95% accuracy can be achieved when the automation rate is at most 30%, and thus if 95% accuracy is desired, no more than 30% of utterances should be processed by natural language processing rather than by humans).

In FIG. 4, various types of input from the LTM process include the jagged curve 324 of FIG. 3, various inputs to the proxy, from Data 218, and potentially live utterances into LTM process, through scoring 306, creating sets of LTM curve$_i$. LTM Curve$_{1-5}$ of FIG. 4 are examples of several sets of the LTM processes through Scoring 306, which outputs various LTM Curves$_{1-5}$, which can include versions of the intent as estimated by Remapper$_i$ 314 in FIGS. 3 and 3A. The select combiner 405, as part of scoring 306, has several different options: (1) it can take each point on the curve and use a majority vote of the intents; (2) it can do some kind of averaging of the intents; or (3) it can arrange the intents in order and take the median, as just some examples. In some embodiments, for example, the select combiner 405 takes the majority vote. Weighting may also be employed so that some inputs to scoring 306 are weighted more heavily than others; e.g., a weighted majority vote could be used. In some embodiments, weights for input intents are based upon reliability of the intents, such as a reliability score for an intent analyst that produced the intent, a score indicating whether the intent was double-checked or hand-labeled, or the like. Depending on the importance of the model, it may require an HI Judge, or sufficient HI CQA scores of the utterances, as discussed above. The output of scoring 306 is considered the true intent, which may be a best estimate.

Each of these LTM curves, designated in FIG. 4 as LTM Curve$_{1-5}$, represents a different example of LTM curves. In this diagram, LTM Curve$_{1-5}$, has multiple values—it's a vector with multiple elements, or a continuous function. LTM Curve$_{1-5}$, is a vector or a function and the weights, W$_6$, W$_7$, W$_8$, W$_9$, W$_{10}$, control the gain of amplifiers 406, 407, 408, 409, and 410 wherein the amplifier inputs are multiplied by weights W$_6$, W$_7$, W$_8$, W$_9$, and W$_{10}$, respectively. The outputs are summed by Σ, 414, 444, and the output is a single LTM Curve$_6$ corresponding to the weighted average of the inputs LTM Curve$_{1-5}$. For illustrative purposes we show three LTM Curve$_{1-3}$ that are averaged together 414, and LTM Curve$_{4-5}$ are averaged 444, then combined into a single LTM Curve$_6$, using amplifier 422. In an alternative embodiment, the output of 414 and 444 are multiplied together, instead of summed by amplifier 422. There could be a single LTM curve, or hundreds of LTM curves, in different embodiments. This output is represented as LTM Curve$_6$. LTM Curve$_6$ is one of several embodiments where the computed curve is the weighted sum of LTM Curve$_{1-5}$.

LTM Curve$_E$ 438 may be computed from templates and template database 432 (a subset of data 218) and these templates 434 reflect the shape of different types of DSIDs so they may have different shapes and different ranges, and are selected using a switch 430 based on what type of DSID is being tested. An LTM curve is associated with a DSID, or type of DSID, or could be a general type. As described previously, there might be a yes/no template, and a telephone number template, both of which are appropriate for certain types of inputs. The templates may be static or they may be parameterized. For example, if one of the templates is an exponential decay shown by the equation y=ae$^{-bx}$+c 436, then a, b and c are parameters that describe the shape of this exponential decay (c is an offset, a is a scaling factor and b is the decay rate). These parameters can be chosen in a number of different ways. In one example, an LTM curve has a certain set of data, and parameters a, b and c are chosen to optimally fit the data collected through this LTM process. As another example, templates may be static (lacking any parameters), so they are simply added into the total via amplifier 416 and summarization 412.

Switch 430 is shown in FIG. 4 as selecting one of the templates. It is also possible to select more than one template and apply a different weight to each template, so that the output of switch 430 is a weighted sum of multiple templates. The templates are then processed through Σ 412, with LTM curve$_6$ as input and enhanced LTM Curve$_E$ 438 as output. This is one option for generating an estimated LTM Curve$_E$. There are several ways of modifying the templates shown in FIG. 4. One such way is to scale the template up or down using amplifier 416, multiplying the input by W$_2$, and that generates the output to Σ 412. Another way to modify the templates is illustrated in FIG. 4A, items 452 and 454, using amplifiers 446 and 448, respectively, weighted by W$_{11}$ and W$_{12}$ and then used to modify the LTM Curve$_6$. Many of the weights shown herein are scalars, i.e. they have a single real-numbered value, but since the output of 305 may be a scalar, W$_3$ and W$_{13}$ may be vectors, each containing multiple elements, so that the outputs of 418 and 446 are vectors that can be combined (e.g. averaged) with other LTM curves. This principle may be extended to other scalar estimators: they may be weighted by vectors to create an LTM curve. For example, if W$_3$ is a vector that consists of all the same value, e.g., (0.1, 0.1, 0.1, . . . ), then any signal coming in through 418 will then generate a constant DC offset, proportional to the output of 305, to raise the template signal up or down, as with W$_{11}$ 452. The weight W$_{13}$ is also a vector that provides a constant DC bias added to the LTM estimate into amplifier 416.

Weights W$_1$ through W$_{13}$, signals 452 and 454, the weights on the amplifiers, and the template, may all be selected in order to optimally fit the data that is collected in an LTM process. For example, in FIG. 4A, samples are collected in an LTM process, and then a template is used with parameters 436 a, b, and c, and weights W$_2$, W$_3$, and W$_{11}$ are selected in a manner to get the best fit for the particular data that was collected during the LTM process.

Another way of modifying the templates is to take outputs 305, 318, amplify them with amplifiers 418 and 419; add the results together, and then use that result as an input to amplifier 416. Signals from 305 and 318 are weighted by some value and added together, and an amplification factor is created for the template using amplifier 422.

Another way to modify LTM curve$_1$ is to average it with LTM curve$_6$ by way of amplifier 422 of FIG. 4A. The output from item 414 of FIG. 4 is multiplied by weight W$_5$ and then added to the LTM curve$_6$ of FIG. 4A, so that the information going into 412 is averaged with whatever is going into 422 to give an average of the LTM curve$_E$ 438. It is also possible to multiply the LTM curve$_6$ by some factor W$_5$, or by some variable factor, which is the output of Σ 412. Σ 412, is also a weighted average of 409 and 410 where the weights are W$_9$ and W$_{10}$.

The general strategy for computing LTM Curve$_i$ is to take several different estimates, templates 434, LTM Curve$_6$, DC offsets or other modifications from items 452 and 454 FIG. 4A, and use these to come up with a better overall estimate by combining multiple estimates together. Although FIG. 4A shows elements from several different estimates being combined into a single enhanced LTM Curve$_1$ 438, not all of those elements are necessary and one or more of them could be left out, and the estimate would then be computed using only the remaining elements.

Another approach to generating an LTM curve is shown in FIG. 4A. In this case, we use a neural net, such as a Deep Neural Net ("DNN") 440, with several inputs 305 smoothing estimator 318, and data, such as 370 in FIG. 3A, and this neural net outputs an LTM curve$_3$ 458. The DNN may be configured such that any signal which is a vector, such as LTM 370 of FIG. 4A, is applied to multiple inputs on the DNN. Any signal that is a scalar, such as 305, may be applied to a single input of the DNN 440. The DNN 440 then has one or more layers of computation with different weights, and it generates an LTM Curve$_3$ 458.

Another approach to using a DNN 440 to generate an LTM Curve$_4$ 456 uses a more classic curve generator similar to the one shown by the Remapper$_i$ 314 of FIG. 3, except that instead of using a select combine algorithm to generate the intent, the intent is generated using a DNN 440. Inputs 305 and 318, $LTM_i$, and other information are combined in the DNN 440, which attempts to estimate the true shape of the LTM curve.

Another embodiment, shown in FIG. 4A item 440, and FIG. 3A, items 370 and 218, contains the utterance, text and metadata. Whatever information is available about each utterance is then transferred to the DNN 440. The utterance is then processed using an instance of $Proxy_i$, as in FIG. 3A item 370. $Proxy_i$ 206 outputs an intent hypothesis and a confidence score. This intent hypothesis is compared to the "true" intent coming out of the DNN 440, and used in the scoring method as shown previously to generate another $LTM_i$ estimate shown in FIG. 4A as $LTM$ $Curve_4$ 456. The Data 218 and the utterance could be coming from a live caller or from an offline database. The LTM process can be running in real time as people are calling the system, or can be run in offline mode based on utterances stored in data 218.

OTHER CONSIDERATIONS

The subject matter above has been described in particular detail with respect to various possible embodiments. Those of skill in the art will appreciate that the subject matter may be practiced in other embodiments. First, the particular naming of the components, capitalization of terms, the attributes, data structures, or any other programming or structural aspect is not mandatory or significant, and the mechanisms that implement the subject matter or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the subject matter, process steps, and instructions in terms of algorithms and symbolic representations of operations on information. These algorithmic descriptions and representations are the means used by those skilled in the arts to most effectively convey the substance of their work to others skilled in the art. These operations, while described functionally or logically, could be embodied in software, firmware or hardware, and when embodied in software, could be downloaded to reside on and be operated from different platforms used by real time network operating systems.

Furthermore, it has also proven convenient at times, to refer to these arrangements of operations as modules or by functional names, without loss of generality.

Unless specifically stated otherwise or as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

The subject matter also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, Memory Sticks, application specific integrated circuits (ASICs), or any type of media suitable for storing electronic instructions, and each coupled to a computer system bus. Furthermore, the computers referred to in the specification may include a single processor or may be architectures employing multiple processor designs, including special graphic processors, for increased computing capability.

In addition, the subject matter is not described with reference to any particular programming language. It is appreciated that a variety of programming languages may be used to implement the teachings of the subject matter as described herein, and any references to specific languages are provided for enablement and best mode of the subject matter.

The subject matter is well suited to a wide variety of computer network systems over numerous topologies. Within this field, the configuration and management of large networks comprise storage devices, cloud computing, and computers that are communicatively coupled to dissimilar computers and storage devices over a network, such as the Internet.

Finally, it should be noted that the language used in the specification has been principally selected for readability and instructional purposes and may not have been selected to delineate or circumscribe the subject matter. Accordingly, the disclosure herein is intended to be illustrative, but not limiting, of the scope of the subject matter.

What is claimed is:

1. A computer-implemented method comprising:
   obtaining, for a given sub-domain encompassed by a given domain, an input data set comprising a plurality of intent recognition automation rates and intent recognition accuracies corresponding to the automation rates;
   obtaining, for each of a plurality of sub-domains disjoint from the given sub-domain and disjoint from each other and encompassed by the given domain, an input data set for a curve correlating intent recognition automation rates with intent recognition accuracy;
   generating a continuous composite curve for the given domain by combining the input data set for the given domain with the input data sets for the curves of the sub-domains;
   quantifying a correctness of the continuous composite curve by comparing the continuous composite curve to a related template curve corresponding to the domain;
   responsive to the correctness being at least a given minimum level, determining that the continuous composite curve is an accurate representation of the input data set;
   receiving an utterance from a user over a computer network;
   determining an intent of the utterance and a corresponding confidence score for the determined intent;
   determining whether the inferred intent is sufficiently accurate by comparing the determined confidence score to a confidence threshold for the continuous composite curve.

2. The computer-implemented method of claim 1, further comprising:
   based on the continuous composite curve, calculating, as the confidence threshold for the continuous composite curve, confidence threshold that provides a maximum intent recognition automation rate with at least a given minimum intent recognition accuracy.

3. The computer-implemented method of claim 1, further comprising:
   responsive to the determined confidence score being lower than the confidence threshold for the continuous composite curve, sending the utterance for analysis by human intent recognition.

4. The computer-implemented method of claim 1, wherein the continuous composite curve corresponds to a given dialog state identifier (DSID) of a current point in a conversation, the computer-implemented method further comprising:
   determining a DSID representing a current point in a conversation in which the utterance was uttered; and
   determining to use the continuous composite curve for the utterance responsive at least in part to determining that the determined DSID matches the DSID corresponding to the continuous composite curve.

5. The computer-implemented method of claim 1, further comprising generating the curves of the sub-domains, the generating comprising:
   receiving utterances from users over a computer network;
   inferring intent of the utterances using either natural language processing intent or human intent recognition as determined by a given automation rate;
   determining true intents of the utterances by:
      identifying differences between intents derived from natural language processing and intents selected by human intent analysts, and
      using a human judge to resolve the identified differences.

6. The computer-implemented method of claim 1, further comprising generating the curves of the sub-domains, the generating comprising:
   receiving utterances from users over a computer network;
   inferring intent of the utterances using either natural language processing intent or human intent recognition as determined by a given automation rate;
   determining true intents of the utterances by:
      identifying differences between intents derived from natural language processing and intents selected by human intent analysts, and
      using intent analyst accuracy scores determined by certified quality assurance utterances to adjudicate differences.

7. The computer-implemented method of claim 1, further comprising generating the curves of the sub-domains, the generating comprising:
   receiving utterances from users over a computer network;
   inferring intent of the utterances using either natural language processing intent or human intent recognition as determined by a given automation rate;
   determining true intents of the utterances by:
      identifying differences between intents derived from natural language processing and intents selected by human intent analysts, and
      using transcribed utterances and natural language processing to determine accurate intents to adjudicate differences.

8. A non-transitory computer-readable storage medium storing instructions that when executed by a computer processor perform actions comprising:
   obtaining, for a given sub-domain encompassed by a given domain, an input data set comprising a plurality of intent recognition automation rates and intent recognition accuracies corresponding to the automation rates;
   obtaining, for each of a plurality of sub-domains disjoint from the given sub-domain and disjoint from each other and encompassed by the given domain, an input data set for a curve correlating intent recognition automation rates with intent recognition accuracy;
   generating a continuous composite curve for the given domain by combining the input data set for the given domain with the input data sets for the curves of the sub-domains;
   quantifying a correctness of the continuous composite curve by comparing the continuous composite curve to a related template curve corresponding to the domain;
   responsive to the correctness being at least a given minimum level, determining that the continuous composite curve is an accurate representation of the input data set;
   receiving an utterance from a user over a computer network;
   determining an intent of the utterance and a corresponding confidence score for the determined intent;
   determining whether the inferred intent is sufficiently accurate by comparing the determined confidence score to a confidence threshold for the continuous composite curve.

9. The non-transitory computer-readable storage medium of claim 8, the actions further comprising:
   based on the continuous composite curve, calculating, as the confidence threshold for the continuous composite curve, confidence threshold that provides a maximum intent recognition automation rate with at least a given minimum intent recognition accuracy.

10. The non-transitory computer-readable storage medium of claim 8, the actions further comprising:
    responsive to the determined confidence score being lower than the confidence threshold for the continuous composite curve, sending the utterance for analysis by human intent recognition.

11. The non-transitory computer-readable storage medium of claim 8, wherein the continuous composite curve corresponds to a given dialog state identifier (DSID) of a current point in a conversation, the actions further comprising:
    determining a DSID representing a current point in a conversation in which the utterance was uttered; and
    determining to use the continuous composite curve for the utterance responsive at least in part to determining that the determined DSID matches the DSID corresponding to the continuous composite curve.

12. The non-transitory computer-readable storage medium of claim 8, the actions further comprising generating the curves of the sub-domains, the generating comprising:
    receiving utterances from users over a computer network;
    inferring intent of the utterances using either natural language processing intent or human intent recognition as determined by a given automation rate;
    determining true intents of the utterances by:
       identifying differences between intents derived from natural language processing and intents selected by human intent analysts, and
       using a human judge to resolve the identified differences.

13. The non-transitory computer-readable storage medium of claim 8, the actions further comprising generating the curves of the sub-domains, the generating comprising:
receiving utterances from users over a computer network;
inferring intent of the utterances using either natural language processing intent or human intent recognition as determined by a given automation rate;
determining true intents of the utterances by:
identifying differences between intents derived from natural language processing and intents selected by human intent analysts, and
using intent analyst accuracy scores determined by certified quality assurance utterances to adjudicate differences.

14. The non-transitory computer-readable storage medium of claim 8, the actions further comprising generating the curves of the sub-domains, the generating comprising:
receiving utterances from users over a computer network;
inferring intent of the utterances using either natural language processing intent or human intent recognition as determined by a given automation rate;
determining true intents of the utterances by:
identifying differences between intents derived from natural language processing and intents selected by human intent analysts, and
using transcribed utterances and natural language processing to determine accurate intents to adjudicate differences.

15. A computer system comprising:
a computer processor; and
a non-transitory computer-readable storage medium storing instructions that when executed by a computer processor perform actions comprising:
obtaining, for a given sub-domain encompassed by a given domain, an input data set comprising a plurality of intent recognition automation rates and intent recognition accuracies corresponding to the automation rates;
obtaining, for each of a plurality of sub-domains disjoint from the given sub-domain and disjoint from each other and encompassed by the given domain, an input data set for a curve correlating intent recognition automation rates with intent recognition accuracy;
generating a continuous composite curve for the given domain by combining the input data set for the given domain with the input data sets for the curves of the sub-domains;
quantifying a correctness of the continuous composite curve by comparing the continuous composite curve to a related template curve corresponding to the domain;
responsive to the correctness being at least a given minimum level, determining that the continuous composite curve is an accurate representation of the input data set;
receiving an utterance from a user over a computer network;
determining an intent of the utterance and a corresponding confidence score for the determined intent;
determining whether the inferred intent is sufficiently accurate by comparing the determined confidence score to a confidence threshold for the continuous composite curve.

16. The computer system of claim 15, the actions further comprising:
based on the continuous composite curve, calculating, as the confidence threshold for the continuous composite curve, confidence threshold that provides a maximum intent recognition automation rate with at least a given minimum intent recognition accuracy.

17. The computer system of claim 15, the actions further comprising:
responsive to the determined confidence score being lower than the confidence threshold for the continuous composite curve, sending the utterance for analysis by human intent recognition.

18. The computer system of claim 15, wherein the continuous composite curve corresponds to a given dialog state identifier (DSID) of a current point in a conversation, the actions further comprising:
determining a DSID representing a current point in a conversation in which the utterance was uttered; and
determining to use the continuous composite curve for the utterance responsive at least in part to determining that the determined DSID matches the DSID corresponding to the continuous composite curve.

19. The computer system of claim 15, the actions further comprising generating the curves of the sub-domains, the generating comprising:
receiving utterances from users over a computer network;
inferring intent of the utterances using either natural language processing intent or human intent recognition as determined by a given automation rate;
determining true intents of the utterances by:
identifying differences between intents derived from natural language processing and intents selected by human intent analysts, and
using a human judge to resolve the identified differences.

20. The computer system of claim 15, the actions further comprising generating the curves of the sub-domains, the generating comprising:
receiving utterances from users over a computer network;
inferring intent of the utterances using either natural language processing intent or human intent recognition as determined by a given automation rate;
determining true intents of the utterances by:
identifying differences between intents derived from natural language processing and intents selected by human intent analysts, and
using intent analyst accuracy scores determined by certified quality assurance utterances to adjudicate differences.

* * * * *